US009071644B2

(12) United States Patent
Auvenshine et al.

(10) Patent No.: US 9,071,644 B2
(45) Date of Patent: Jun. 30, 2015

(54) AUTOMATED SECURITY POLICY ENFORCEMENT AND AUDITING

(71) Applicant: International Business Machines Corporation, Armonk, NY (US)

(72) Inventors: John J. Auvenshine, Tucson, AZ (US); Erik Bartholomy, Superior, CO (US); Thomas E. Haddock, Highland Mills, NY (US); Andrew G. Hourselt, Tucson, AZ (US); John T. Olson, Tucson, AZ (US); Kenneth D. Paquette, Essex Junction, VT (US); Victor L. Walter, Hygiene, CO (US); Stanley C. Wood, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 13/706,406

(22) Filed: Dec. 6, 2012

(65) Prior Publication Data
US 2014/0165128 A1    Jun. 12, 2014

(51) Int. Cl.
*G06F 17/00* (2006.01)
*H04L 29/06* (2006.01)
*G06F 15/177* (2006.01)
*G06F 15/173* (2006.01)

(52) U.S. Cl.
CPC .......... *H04L 63/20* (2013.01); *H04L 29/06843* (2013.01); *H04L 29/06891* (2013.01); *H04L 63/104* (2013.01); *H04L 63/1408* (2013.01)

(58) Field of Classification Search
CPC ............ H04L 67/1097; H04L 41/0866; H04L 41/0869; H04L 41/0873; H04L 41/0876; H04L 41/0879; H04L 41/0883; H04L 41/0893; H04L 41/20; H04L 41/50; H04L 41/12; H04L 41/16
USPC ................ 726/1–4, 21, 26, 27; 709/223–232, 709/238–244
See application file for complete search history.

(56) References Cited

U.S. PATENT DOCUMENTS

| 6,728,748 | B1 * | 4/2004 | Mangipudi et al. ........... 718/105 |
| 7,249,170 | B2 | 7/2007 | Tindal et al. |
| 7,386,585 | B2 * | 6/2008 | Agrawal et al. ............... 709/200 |
| 7,398,434 | B2 | 7/2008 | Auvenshine et al. |
| 7,506,040 | B1 * | 3/2009 | Rabe et al. .................... 709/223 |
| 7,676,559 | B2 | 3/2010 | Cuervo |

(Continued)

OTHER PUBLICATIONS bnet.builder, About Bayesian Belief Networks, Copyright 2005 Charles River Analytics, Inc., www.cra.com, 14 pages.

(Continued)

*Primary Examiner* — Tae Kim
(74) *Attorney, Agent, or Firm* — Schmeiser, Olsen & Watts; William Schiesser

(57) ABSTRACT

An approach for managing a connection to or from a device is presented. Connections of the device are identified. Based on the connections, the device is determined and classified based on security zones to which the device is or has been connected, a quality of service requirement for one or more applications within the device, or a level of information technology service management for the device. Whether an existing or proposed connection of the device is consistent with the classification of the device is determined, and if not, an indication is displayed or a notification is sent that the existing or proposed connection is inconsistent with the classification of the device.

18 Claims, 5 Drawing Sheets

(56) References Cited

U.S. PATENT DOCUMENTS

| | | | |
|---|---|---|---|
| 7,689,685 B2* | 3/2010 | Ahmed et al. | 709/224 |
| 7,757,268 B2 | 7/2010 | Gupta et al. | |
| 7,886,031 B1* | 2/2011 | Taylor et al. | 709/221 |
| 7,962,445 B2 | 6/2011 | Auvenshine et al. | |
| 8,069,230 B2* | 11/2011 | Lancaster et al. | 709/221 |
| 8,082,337 B1* | 12/2011 | Davis et al. | 709/223 |
| 8,131,831 B1* | 3/2012 | Hu | 709/223 |
| 8,719,143 B2* | 5/2014 | Meijer et al. | 705/37 |
| 2004/0103058 A1* | 5/2004 | Hamilton | 705/38 |
| 2005/0050193 A1* | 3/2005 | Edwiges et al. | 709/223 |
| 2005/0193231 A1* | 9/2005 | Scheuren | 714/5 |
| 2006/0095885 A1* | 5/2006 | Agrawal et al. | 716/12 |
| 2006/0271677 A1* | 11/2006 | Mercier | 709/224 |
| 2008/0077682 A1* | 3/2008 | Nair et al. | 709/223 |
| 2008/0080396 A1* | 4/2008 | Meijer et al. | 370/254 |
| 2008/0256323 A1* | 10/2008 | Mopur et al. | 711/173 |
| 2008/0275933 A1* | 11/2008 | Agrawal et al. | 709/200 |
| 2008/0275934 A1* | 11/2008 | Agrawal et al. | 709/200 |
| 2009/0094664 A1* | 4/2009 | Butler et al. | 726/1 |
| 2009/0113044 A1* | 4/2009 | Lancaster et al. | 709/224 |
| 2009/0222733 A1* | 9/2009 | Basham et al. | 715/736 |
| 2012/0036240 A1* | 2/2012 | Lancaster et al. | 709/221 |
| 2013/0073702 A1* | 3/2013 | Umbehocker | 709/222 |
| 2014/0122695 A1* | 5/2014 | Kulikov et al. | 709/224 |

OTHER PUBLICATIONS

Ok et al., The Design of Service Management System based on Policy-based Network Management, 07695-2622-5/06 (c) 2006 IEEE, 6 pages.

* cited by examiner

AUTOMATED SECURITY POLICY ENFORCEMENT AND AUDITING

TECHNICAL FIELD

The present invention generally relates to a data processing method and system for enforcing and auditing a security policy, and more particularly to managing a connection between devices to enforce or audit a security policy.

BACKGROUND

Ensuring proper security in a complex multi-zone information technology (IT) environment is complex and error prone. The connections between policies, administration and audit in the aforementioned environment are weak and based on human effort. Managers set policies for the environment. For example, a policy may indicate that servers in a zone of a particular security level (e.g., blue) cannot be directly connected to network or storage logical unit numbers (LUNs) in another zone of a different security level (e.g., green). Managers would set the aforementioned policy because they do not want to connect resources from different colored zones (e.g., blue zone to green zone). The policies are communicated to administrators, who perform manual tasks to correctly configure the connections of new or upgraded servers to other resources in the IT environment, where the correct configuration is based on the policies. Periodically, the IT environment must be audited to verify that servers and other devices are connected properly, according to the policies. Each of the aforementioned processes is labor intensive and error prone.

BRIEF SUMMARY

An embodiment of the present invention is a system, method and program product for managing a connection to or from a device. Connections of the device are identified. Based on the connections, the device is determined and classified based on security zones to which the device is or has been connected, a quality of service requirement for one or more applications within the device, or a level of information technology service management (ITSM) for the device. Whether an existing or proposed connection of the device is consistent with the classification of the device is determined, and if not, an indication is displayed or a notification is sent that the existing or proposed connection is inconsistent with the classification of the device.

Embodiments of the present invention reduce complexity, time-consuming manual work, and human-based errors associated with enforcing, auditing and tracking modifications to one or more policies of an IT environment. Embodiments of the present invention reduce the chance that an administrator incorrectly configures a system due to a misapplication of security policy (e.g., by mistakenly adding a data storage resource for confidential information into a pool designated for non-confidential information). Embodiments of the present invention reduce the manual work involved in identifying a computer resource that is compliant with an existing policy associated with that resource.

DETAILED DESCRIPTION

Overview

Embodiments of the present invention encode security policies for IT environments; automatically build knowledge of connections between devices and other computing resources in the IT environments; flag potentially non-compliant connections in the IT environments; present administrators with compliant connection and resource assignments; and provide reports for audits of the IT environments.

System for Managing a Connection to Enforce and/or Audit a Security Policy

Figure 1:
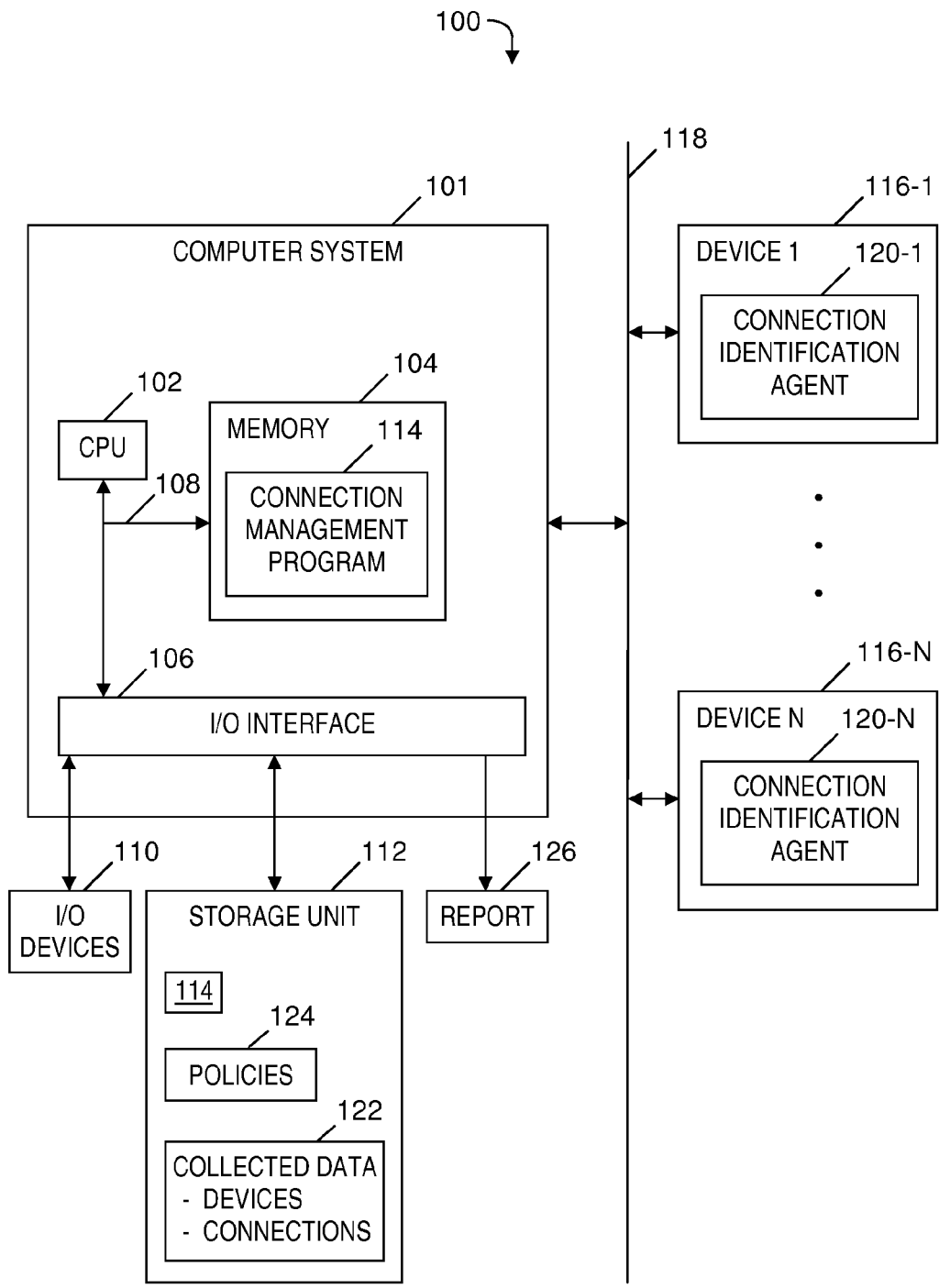
FIG. 1 is a block diagram of a system for managing a connection to or from a device, in accordance with embodiments of the present invention.

FIG. 1 is a block diagram of a system for managing a connection to or from a device, in accordance with embodiments of the present invention. System 100 includes a computer system 101, which generally comprises a central processing unit (CPU) 102, a memory 104, an input/output (I/O) interface 106, and a bus 108. Further, computer system 101 is coupled to I/O devices 110 and a computer data storage unit 112. CPU 102 executes connection management program 114 stored in disk storage 112 via memory 104 to manage a connection to or from a device in a networked environment to enforce and/or audit one or more security policies of the environment. Computer system 101, CPU 102, memory 104, I/O interface 106, bus 108, I/O devices 110, storage unit 112 and connection management program 114 are further described in the section entitled Computer System presented below.

System 100 includes devices 116-1 . . . 116-N, where N is an integer greater than one. Computer system 101 receives data from devices 116-1 . . . 116-N via computer network 118. Devices 116-1 . . . 116-N execute connection identification agents 120-1 . . . 120-N, respectively. Each of connection identification agents 120-1 . . . 120-N is a software-based agent that, when executed by the corresponding device included in devices 116-1 . . . 116-N, identifies the corresponding device and attributes of the device, and further identifies (1) connection(s) from one device to the corresponding device and/or (2) connection(s) from the corresponding device to another device. In one embodiment, the identified attributes includes security zones to which the device is or has been connected, a quality of service requirement for one or more applications within the device, and/or a level of ITSM for the device. The connection identification agents 120-1 . . . 120-N send the identified devices, attributes, and connections via network 118 to computer system 101, for storage in collected data 122 and for processing by connection management program 114. In one embodiment, computer system 101 is a control server computer or a monitoring server computer that manages data received from devices 116-1 . . . 116-N via network 118.

In one embodiment, devices 116-1 . . . 116-N include computer resources, which include server computer systems, network switches, data storage devices, firewalls, and/or storage area network (SAN) switches. In another embodiment, system 100 includes other computer resources (not shown) in addition to devices 116-1 . . . 116-N, where the connections in network 118 to and from the other resources are identified by connection identification agents 120-1 ... 120-N and/or other connection identification agents (not shown). The aforementioned other resources include software applications, virtual private networks (VPNs), LUNs, databases, IP addresses, IT delivery sites, cluster definitions, and/or support contact lists.

Via I/O interface 106, connection management program 114 receives the aforementioned identified connections. Connection management program 114 generates a Bayesian belief network using the received connections to determine groupings of devices 116-1 ... 116-N or the likelihood of different groupings of devices 116-1 ... 116-N.

Based on the groupings, connection management program 114 determines or receives classifications of devices 116-1 ... 116-N, where the classifications specify respective policies 124, which include security policies. A policy may be a security policy or rule that states, for example, LUNs from one SAN zone set can only be seen by servers connected to the same network switch set. Policies 124 also include identifiers or labels assigned to different groupings associated with policies, such as names for different security zones (i.e., blue, green, yellow, red, etc.). In another embodiment, policies 124 include governance policies and/or organization policies, which may include policies associated with quality of service (QOS), business criticality values, export classifications, resilience levels, costs, capacities, performance levels, and/or levels of service specified by technology service management (ITSM) (see Table 1 presented below).

Connection management program 114 stores a mapping of the devices 116-1 ... 116-N to the classifications and to policies 124 specified by the classifications. Connection management program 114 stores the aforementioned mapping in a data repository such as storage unit 112 or another computer data storage device (not shown) coupled to computer system 101. Based on the stored mapping of devices to classifications and policies, connection management program 114 determines whether an existing or proposed connection to or from a device is consistent or inconsistent with the classification of the device (i.e., whether the existing or proposed connection is potentially non-compliant with a policy included in policies 124, where the policy is specified by the classification of the device).

Connection management program 114 flags potentially non-compliant connections and stores indications of potentially non-compliant connections in a data repository coupled to computer system 101, such as storage unit 112.

In one embodiment, connection management program 114 generates a report 126 (i.e., an alert or audit) for viewing by a user (e.g., an auditor). Report 126 includes identifications of devices 116-1 ... 116-N and the identified connections between devices 116-1 ... 116-N. Report 126 may also include indicators that flag which connections are potentially not compliant with policies 124. An auditor can view report 126 sorted by security zones, names of devices, IP addresses, etc. An auditor may compare report 124 to other data sources, such as a dump of a Domain Name System, firewall/router logs, etc., to verify the information in report 124.

In one embodiment, connection management program 114 requests and receives confirmations from user(s), where a confirmation designates a potentially non-compliant connection to or from a device as being acceptable in system 100, without requiring a modification of the connection or removal of the connection.

The functionality of components of system 100 is further described below in the discussion relative to FIGS. 2A-2B and in the section entitled Computer System.

Process for Managing a Connection to Enforce and/or Audit a Security Policy

Figure 2A:
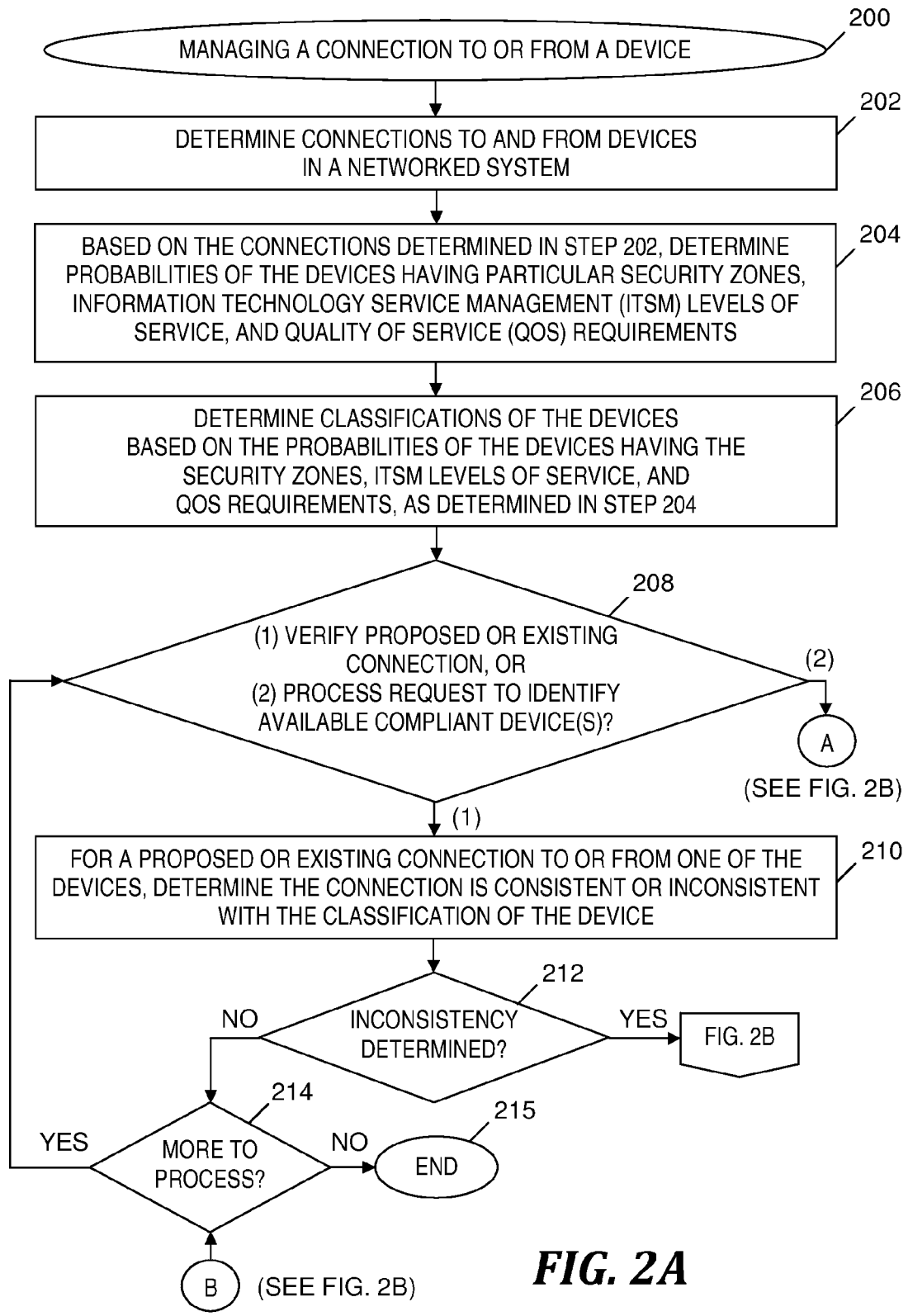
FIGS. 2A-2B depict a flowchart of a connection management program executed in a computer system included in the system of FIG. 1, in accordance with embodiments of the present invention.
Figure 2B:
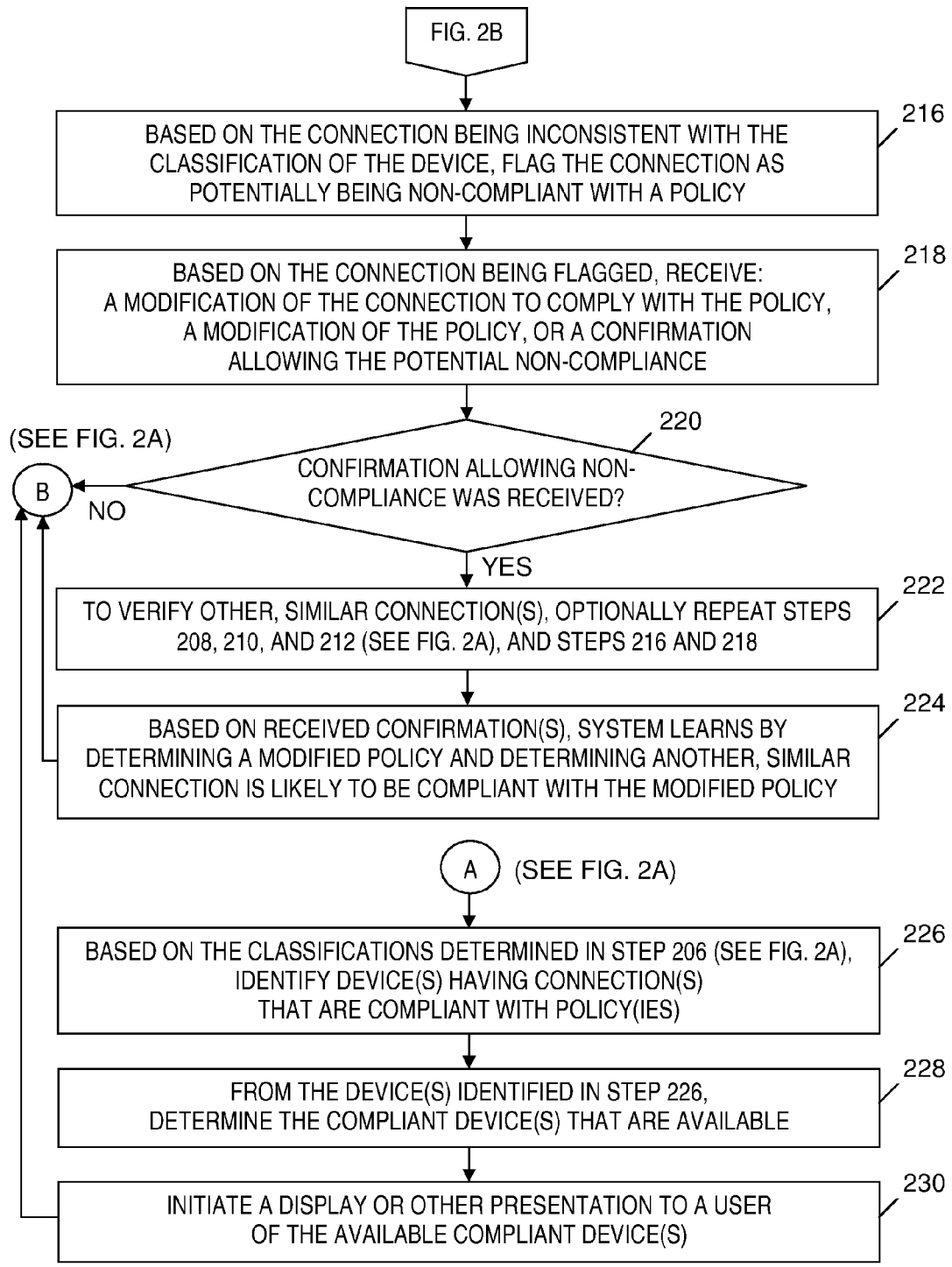

FIGS. 2A-2B depict a flowchart of a connection management program executed in a computer system included in the system of FIG. 1, in accordance with embodiments of the present invention. The process of FIGS. 2A-2B starts at step 200 in FIG. 2A. In one embodiment, the process of FIGS. 2A-2B starts with an assumption that system 100 (see FIG. 1) is in an environment that already exists and is substantially, but not completely, compliant with policies 124 (see FIG. 1), where substantial compliance with policies 124 (see FIG. 1) is based on a number or percentage of compliant connections in system 100 (see FIG. 1) being greater than a threshold value.

In step 202, connection management program 114 (see FIG. 1) determines identifications of devices 116-1 ... 116-N (see FIG. 1) and factors (i.e., attributes) (e.g., security zones) of devices 116-1 ... 116-N (see FIG. 1), and identifies connections to and from devices 116-1 ... 116-N (see FIG. 1) in system 100 (see FIG. 1).

In one embodiment, connection management program 114 (see FIG. 1) determines the identifications of devices 116-1 ... 116-N (see FIG. 1), the aforementioned factors, and the connections to and from devices 116-1 ... 116-N in step 202 by receiving collected data 122 (see FIG. 1) from connection identification agents 120-1 ... 120-N (see FIG. 1) via network 118 (see FIG. 1). Collected data 122 includes identifications of devices 116-1 ... 116-N (see FIG. 1), attributes of devices 116-1 ... 116-N (see FIG. 1), and connections to and from devices 116-1 ... 116-N (see FIG. 1). Connection management program 114 (see FIG. 1) stores collected data 122 (see FIG. 1) in a data repository in storage unit 112 (see FIG. 1).

In one embodiment, connection management program 114 (see FIG. 1) determines the aforementioned devices, attributes and connections in step 202 by receiving collected data 122 that is gathered by agent programs disclosed in Auvenshine et al., Method and System for Importing an Application and Server Map to a Business Systems Manager Display, U.S. Pat. No. 7,962,445, issued Jun. 14, 2011 or in Auvenshine et al., Computer Generated Documentation Including Diagram of Computer System, U.S. Pat. No. 7,398,434, issued Jul. 8, 2008, which are hereby incorporated herein by reference, in their entirety. Connection management program 114 (see FIG. 1) may also monitor an operational status of an identified connection subsequent to step 202 by using the monitoring method described in Ahmed et al., Autonomic Monitoring for Web High Availability, U.S. Pat. No. 7,689,685, issued Mar. 30, 2010, which is hereby incorporated herein by reference, in its entirety.

In step 204, based on the connections determined in step 202, connection management program 114 (see FIG. 1) determines multiple factors for classifying devices 116-1 ... 116-N (see FIG. 1). In one embodiment, step 204 includes connection management program 114 (see FIG. 1) determining probabilities of devices 116-1 ... 116-N (see FIG. 1) having a combination of: particular security zones to which the devices are or have been connected, particular quality of service requirements for application(s) within the devices, particular levels of ITSM, particular business criticality values (BCVs) indicating impacts the devices have on an operation of a business, particular export classifications specified by policies for exporting the devices, particular resilience levels required by system 100 (see FIG. 1), particular costs required by system 100 (see FIG. 1), particular capacities required by system 100 (see FIG. 1), or particular performance levels required by system 100 (see FIG. 1).

In another embodiment, step 204 includes connection management program 114 (see FIG. 1) determining probabilities of devices 116-1 ... 116-N (see FIG. 1) having particular security zones to which devices 116-1 . . . 116-N (see FIG. 1) are or have been connected, QOS requirements for application(s) within devices 116-1 . . . 116-N (see FIG. 1), and levels of ITSM for devices 116-1 . . . 116-N (see FIG. 1), and optionally having one or both of the following factors: particular business criticality values and export classifications.

Within enterprises, ITSM levels of service correspond to different support tiers that have unique characteristics. For instance, Tier 1 applications have the following characteristics: unique monitoring (i.e., unique flows coming in and going out), high tiered storage, and servers classified as Group 1 DR. Connection management program 114 (see FIG. 1) assesses a number of combinations of devices and connections to determine if servers for a given application have characteristics similar to the characteristics of applications in the same tier. If a new combination is created for a given ITSM policy, but the server does not exhibit the aforementioned characteristics, then connection management program 114 (see FIG. 1) considers the new combination inconsistent with ITSM Tier 1 (i.e., considers the likelihood of the new combination being in ITSM Tier 1 to be substantially low).

Connection management program 114 (see FIG. 1) determines the QOS requirement by checking the flow protocol and port number of existing connections because certain port flows invoke a resource with a certain quality of service (i.e., a resource with a particular QOS requirement supports a particular port flow). For example, one particular port flow invokes a database with a fast or slow response time. If the active protocol and ports go to a fast database, then a server having a high QOS is indicated.

In one embodiment, connection management program 114 (see FIG. 1) compares a combination of computer resources (e.g., server resources and storage resources) and flow protocol and port number to determine a probability of a QOS requirement based on similar connections already in existence in system 100 (see FIG. 1). In this case, similar connections are those connections that connect the same types of resources and support the same flow protocol and the same port number.

In one embodiment, connection management program 114 (see FIG. 1) in step 204 determines a probability of a device having a particular factor such as a particular security zone by generating a Bayesian belief network that models devices 116-1 . . . 116-N (see FIG. 1) as nodes, with conditional probabilities of each node representing the probabilities of connections to or from the device represented by the node. Connection management program 114 (see FIG. 1) models the connections of the device as evidence in the Bayesian belief network and further models other devices included in devices 116-1 . . . 116-N (see FIG. 1) as prior information or past experience in the Bayesian belief network. Connection management program 114 (see FIG. 1) determines the probability of the device having particular factor(s) (e.g., a particular security zone, a particular ITSM level of service, and a particular QOS requirement), based on the conditional probabilities that are provided by the Bayesian belief network and that are associated with the device.

In one embodiment, connection management program 114 (see FIG. 1) generates the Bayesian belief network according to the process disclosed in *About Bayesian Belief Networks*, Charles River Analytics, Inc. 2005, pages 3-13. Connection management program 114 (see FIG. 1) may include BNet-.Builder to generate the Bayesian belief network in step 204. BNet.Builder is a software tool for building a Bayesian belief network, and is offered by Charles River Analytics, Inc., located in Cambridge, Mass.

In step 206, connection management program 114 (see FIG. 1) determines N classifications of devices 116-1 . . . 116-N (see FIG. 1), respectively. Connection management program 114 (see FIG. 1) determines the classifications in step 206 based on the probabilities of the devices having the aforementioned multiple factors, where the probabilities were determined in step 204.

In one embodiment, connection management program 114 (see FIG. 1) determines the classifications of the devices in step 206 based on the probabilities of the devices having their respective factors (e.g., security zones, ITSM levels of service, and QOS requirements), where the probabilities are provided by the aforementioned Bayesian belief network that models devices 116-1 . . . 116-N (see FIG. 1) and the connections to and from the devices.

For example, if a device is connected to 20 other devices that are in a blue security zone and to only one other device that is in a yellow security zone, then connection management program 114 (see FIG. 1) in step 204 determines that there is a high probability that the device is a device in a blue security zone and in step 206 classifies the device as a blue security zone device.

In one embodiment, in step 206, connection management program 114 (see FIG. 1) initially determines randomly assigned labels for respective classifications of the devices. Subsequently, connection management program 114 (see FIG. 1) receives from a human administrator the specific, predefined labels that correspond to the randomly assigned labels. For example, connection management program 114 (see FIG. 1) may assign Devices 1-4 and 8-10 to "Group 1" and Devices 5-7 to "Group 2," without yet knowing what security zones correspond to Group 1 and Group 2. A human administrator reviews the devices assigned to Group 1 and Group 2, and based on the review, assigns the Group 1 devices to the Blue security zone and the Group 2 devices to the Yellow security zone. Connection management program 114 (see FIG. 1) receives the assignments of Group 1 to the Blue security zone and Group 2 to the Yellow security zone.

In step 208, connection management program 114 (see FIG. 1) determines whether processing will continue with (1) verifying a proposed connection or an existing connection in system 100 (see FIG. 1), or (2) processing a request to identify available compliant device(s) in system 100 (see FIG. 1). If connection management program 114 (see FIG. 1) determines that processing will continue with verifying a proposed or existing connection, then the "(1)" branch of step 208 is taken and step 210 is performed. In one embodiment, connection management program 114 (see FIG. 1) determines that processing will continue with verifying a proposed or existing connection based on connection management program 114 (see FIG. 1) receiving a user request to verify a proposed or existing connection prior to step 208.

In step 210, for a proposed connection to or from one of devices 116-1 . . . 116-N (see FIG. 1) or an existing connection to or from a device (i.e., one of devices 116-1 . . . 116-N (see FIG. 1)), connection management program 114 (see FIG. 1) determines the proposed or existing connection is consistent with the classification of the device or inconsistent with the classification of the device. The classification of the device is one of the N classifications determined in step 206 that corresponds to the device. The classification of the device specifies one or more policies included in polices 124 (see FIG. 1).

In one embodiment, connection management program 114 (see FIG. 1) determines the proposed or existing connection is consistent with the classification of the device or inconsistent with the classification of the device by determining if the connection complies with policies 124 (see FIG. 1). If the connection does not comply with policies 124 (see FIG. 1), then connection management program 114 (see FIG. 1) determines that the connection is inconsistent with the classification of the device.

After connection management program 114 (see FIG. 1) assigns a label to a device (i.e., classifies the device in step 206), the results of an association between another device and the labeled device is determined by a policy included in policies 124 (see FIG. 1). The policy is a rule corresponding to devices having the aforementioned label in a particular associational context. The associational context is determined by a particular factor determined in step 204. For example, after a server is labeled as Tier 1 in a quality of service context, there may be a policy in policies 124 (see FIG. 1) that states that network traffic coming out of that Tier 1 server must be prioritized over servers labeled as Tier 2 and servers labeled as Tier 3. This policy can be automatically entered as a QOS statement in routers connected to servers in system 100 (see FIG. 1). Table 1 summarizes the associational contexts, the devices and other resources that can be analyzed for connections, examples of labels for the devices and other resources, and examples of policies.

step 212 that the proposed or existing connection is inconsistent with the classification of the device, then the Yes branch of step 212 is taken, and the process of FIGS. 2A-2B continues in FIG. 2B. Otherwise, if connection management program 114 (see FIG. 1) determines in step 212 that the proposed or existing connection is consistent with the classification of the device, then the No branch of step 212 is taken, and step 214 is performed.

In step 214, connection management program 114 (see FIG. 1) determines whether more processing is required for verifying other proposed or existing connection(s) or for processing other request(s) to identify available compliant device(s). If step 214 determines that more processing is required, then the Yes branch of step 214 is taken and the process of FIGS. 2A-2B loops back to step 208; otherwise, the No branch of step 214 is taken (i.e., no more processing is required), and the process of FIGS. 2A-2B ends at step 215.

Returning to step 208, if connection management program 114 (see FIG. 1) determines that processing will continue with processing a request to identify available compliant device(s) in system 100 (see FIG. 1), then the "(2)" branch of step 208 is taken and the process of FIGS. 2A-2B continues in FIG. 2B.

TABLE 1

| Association Context | Resources to be analyzed for links that establish Bayesian probability of association | Examples of labels for the high probability associations found in the analysis | Example(s) of policies to be applied based on the labeled associations |
| --- | --- | --- | --- |
| Security/ Compliance/ Auditing | Servers, network switches, firewalls, VPNs, SAN switches, storage devices/ LUNs, databases | Blue zone, Yellow zone, Green zone, Red zone | Yellow zone servers may be connected to only Yellow zone storage LUNs; Green zone servers may be connected only to Blue zone servers via a VPN |
| ITSM classification | Servers, storage devices/LUNs, VPNs, applications, Internet Protocol (IP) addresses | Development/Test, Internal Production, External Production, Customer (per customer) | Development/Test servers and Internal Production servers may not have internet accessible IP addresses; Customer A's servers may not connect to Customer B's servers |
| Business Criticality Value | Servers, applications, VPNs, IT delivery sites, databases | Experimental, Standard, Revenue Generating, Regulatory Requirement | Revenue Generating applications must be hosted on at least three redundant servers spread across at least two separate IT delivery sites |
| Quality of Service | Cluster definitions, storage devices/ LUNs, applications, firewalls, VPNs, IT delivery sites | Batch, Online Transaction Processing (OLTP), Asynchronous | Network traffic coming out of Tier 1 servers must always be prioritized over servers in Tier 2 and Tier 3; High Availability applications must be hosted on at least two different physical servers |
| Export Classification | IT delivery sites, applications, databases, support contact lists | Global Delivery, Country Specific Economic (per country), Country Specific Security per country), International Traffic in Arms Regulations (ITAR) | ITAR classified applications for customers in the United States may be hosted only at sites located in the United States and may list only United States citizens as support contacts |
| Resilience | Server Clusters, RAID, Disaster Recovery, Load Balancing | Shared Deployment Model, Business Shared, Dedicated, OOP Dedicated | Deployment models in a delivery center must provide a certain level of availability for a given pattern, from little to no resiliency to high resiliency |
| Cost | Servers, CPUs, Memory, I/O Storage | Usage based billing, resource pools (e.g., server and storage pools) | For a cost conscious hosting environment, applications cannot exceed a certain cost of operation |
| Capacity & Performance | CPUs, Disk I/O, memory | Batch, OLTP, Asynchronous | Based on workload characteristics, different classes of processor or memory are selected |

In step 212, connection management program 114 (see FIG. 1) determines whether the inconsistency with the classification of the device was determined in step 210. If connection management program 114 (see FIG. 1) determines in Step 216 in FIG. 2B follows the Yes branch of step 212 (see FIG. 2A). In step 216, based on the connection being inconsistent with the classification of the device, connection management program 114 (see FIG. 1) flags the connection as being potentially non-compliant with the policy specified by the classification of the device determined in step 206 (see FIG. 2A). In one embodiment, connection management program 114 (see FIG. 1) in step 216 initiates a display of an indication or sends a notification that the connection is inconsistent with the classification of the device. In one embodiment, connection management program 114 (see FIG. 1) generates report 126 (see FIG. 1), which includes the flagged non-compliant connections, and which is viewed by a human administrator. The human administrator determines whether a modification of a connection is needed to correct a non-compliant connection (i.e., to make the connection compliant with policies 124 (see FIG. 1)).

For example, based on the collected data 122 (see FIG. 1) and the mapping of servers to storage subsystems via a network switch, connection management program 114 (see FIG. 1) determines that all the servers except one have LUNs on storage connected to a particular SAN zone. Connection management program 114 (see FIG. 1) can flag the server that is the exception in step 216. Even if connection management program 114 (see FIG. 1) has not learned what the particular zones are, connection management program 114 (see FIG. 1) in step 216 can flag the server that is the exception in step 216. In either case, connection management program 114 (see FIG. 1) can initiate a display that includes the flagged exception or include the flagged exception in report 126, so that a human administrator or auditor can review the exception and decide whether to allow the exception, modify the connection associated with the exception, or modify the policy that does not allow the exception.

In step 218, based on the connection being flagged in step 216, connection management program 114 (see FIG. 1) performs action(s) to respond to the potentially non-compliant connection. In one embodiment, connection management program 114 (see FIG. 1) in step 218 receives (1) a modification of the connection so that the modified connection is in compliance with the policy specified by the classification; (2) a modification of the policy specified by the classification so that the connection is in compliance with the modified policy; or (3) a confirmation from a manager, administrator or other user indicating the non-compliant connection is acceptable in system 100 (see FIG. 1) (i.e., a confirmation allowing the potential non-compliance). In one embodiment, if connection management program 114 (see FIG. 1) in step 218 receives the aforementioned modification of the connection, then in a loop not shown, steps 204, 206, 208, 210 and 212 in FIG. 2A are repeated using the modified connection, so that connection management program 114 (see FIG. 1) scans the modified connection to determine if the modified connection is consistent or inconsistent with the classification of the device.

In one embodiment, connection management program 114 (see FIG. 1) predicts the security zone of a device based on the probabilities determined in step 204 (see FIG. 2A), but in step 210 (see FIG. 2A), connection management program 114 (see FIG. 1) identifies an error (i.e., the actual security zone of the device does not match the predicted security zone) (e.g., the predicted zone of a server is green, while the server is actually in a blue zone). Connection management program 114 (see FIG. 1) notifies a human administrator of the error. The human administrator may correct the error while system 100 (see FIG. 1) is in advisory mode running alongside existing security processes. Connection management program 114 (see FIG. 1) receives the correction of the error in step 218. The correction of the error includes a modification of the connection. In response to receiving the correction of the error, connection management program 114 (see FIG. 1) updates a state of system 100 (see FIG. 1) in a data repository (e.g., a database in computer system 101 (see FIG. 1)) and updates probabilities of the correctness of the actual security zone in the Bayesian belief network, so that the updated probabilities will be used in future predictions of security zones of other devices.

In step 220, connection management program 114 (see FIG. 1) determines if a confirmation allowing the potential non-compliance was received in step 218. If connection management program 114 (see FIG. 1) determines in step 220 that the aforementioned confirmation was received, then the Yes branch of step 220 is taken and step 222 is performed.

In step 222, connection management program 114 (see FIG. 1) optionally repeats the following set of steps one or more times: steps 208, 210 and 212 (see FIG. 2A), and steps 216 and 218. Each time the aforementioned set of steps is repeated in step 222, connection management program 114 (see FIG. 1) verifies another proposed or existing connection to or from another device, where the other connection is similar to the connection that was flagged as being potentially non-compliant in the performance of step 216 prior to step 222, and where a confirmation allowing the corresponding non-compliance is received in the repetition of step 218 in step 222. As used herein, another connection to or from another device is similar to a connection to or from a device (i.e., a connection flagged in step 216) if a classification of the other device matches the classification of the device determined in step 206.

In step 224, based on the received confirmation(s) in steps 218 and 222, connection management program 114 (see FIG. 1) optionally learns to modify what connections are considered compliant by modifying the policy used in step 216 and associating the modified policy with the classification of the device used in step 210 (see FIG. 2A). In one embodiment, connection management program 114 (see FIG. 1) in step 224 modifies the policy and determines another connection, which is being verified and which is similar to the connection that had been flagged in step 216, is in compliance with the modified policy. That is, connection management program 114 (see FIG. 1) determines that the other connection to or from another device is consistent with the classification of the other device due to the classification of the other device matching the classification used in step 210 (see FIG. 2A) and therefore being associated with the modified policy.

In one embodiment, prior to step 224 and after step 222, connection management program 114 (see FIG. 1) determines that the number of received confirmations exceeds a configurable threshold value that is received by connection management program 114 (see FIG. 1) prior to step 224. Received confirmations are the confirmations received in step 218 and step 222. Based on the number of received confirmations exceeding the threshold value, connection management program 114 (see FIG. 1) in step 224 modifies the aforementioned policy and associates the modified policy with the classification of the device, as discussed above, thereby avoiding the need to request confirmations for similar connections in the future. By determining the number of received confirmations exceeds the threshold value, connection management program 114 (see FIG. 1) learns that the connection associated with the device is compliant with the modified policy and will not request a user to verify a similar connection in the future. By being configurable, the aforementioned threshold value may be a higher value for a system that has a strict requirement to confirm all or almost all anomalies flagged in step 216, and the threshold value may be a lower value for a system that has more lenient requirements about confirming anomalies.

Following step 224, the process of FIGS. 2A-2B loops back to step 214 (see FIG. 2A) to determine whether or not there is more processing to complete.

Returning to step 220, if connection management program 114 (see FIG. 1) determines that the confirmation was not received in step 218, then the No branch of step 220 is taken and the process of FIGS. 2A-2B loops back to step 214 (see FIG. 2A) to determine whether or not there is more processing to complete.

Returning to taking the "(2)" branch of step 208 (see FIG. 2A), connection management program 114 (see FIG. 1) initiates processing of a request to identify device(s) that are available in system 100 (see FIG. 1) and that are compliant with one or more policies that are specified in the request and that are included in policies 124 (see FIG. 1). Step 226 in FIG. 2B is performed after following the "(2)" branch of step 208. In step 226, based on the classifications determined in step 206 (see FIG. 2A), connection management program 114 (see FIG. 1) identifies device(s) having connection(s) that are compliant with the one or more policies specified in the request.

In step 228, from the compliant device(s) identified in step 226, connection management program 114 (see FIG. 1) determines the compliant device(s) that are also available in system 100 (see FIG. 1). After step 228 and prior to step 230, connection management program 114 (see FIG. 1) retrieves identification(s) of the available, compliant device(s) from collected data 122 (see FIG. 1).

In step 230, connection management program 114 (see FIG. 1) initiates a display or other presentation to a user of the identification(s) (e.g., LUN(s)) of the compliant device(s) that are also available in system 100 (see FIG. 1) or creates new connection(s) to at least one of the compliant device(s) that are available in system 100 (see FIG. 1). In one embodiment, the display in step 230 also includes identifications of device(s) that are not available and/or non-compliant with policies 124 (see FIG. 1). In one embodiment, identification(s) (e.g., LUN(s)) of the available, compliant device(s) are included in report 126 (see FIG. 1) in step 230. Report 126 may optionally also include identification(s) of non-available and/or non-compliant device(s).

In one embodiment, by performing steps 226, 228 and 230, connection management program 114 (see FIG. 1) indicates to a user the available, compliant devices that may be used in a configuration of the system and the non-available and/or non-compliant devices that may not be used in the configuration, without having been instructed to use one or more particular devices.

For example, without being instructed to use particular LUNs, connection management program 114 (see FIG. 1) generates a list of LUNs of available, compliant devices in step 230, which indicates to a user that the devices identified by the listed LUNs can be used, but the devices identified by other LUNs may not be used.

Following step 230, the process of FIGS. 2A-2B loops back to step 214 (see FIG. 2A) to determine if there is more processing to complete.

EXAMPLE

Figure 3A:
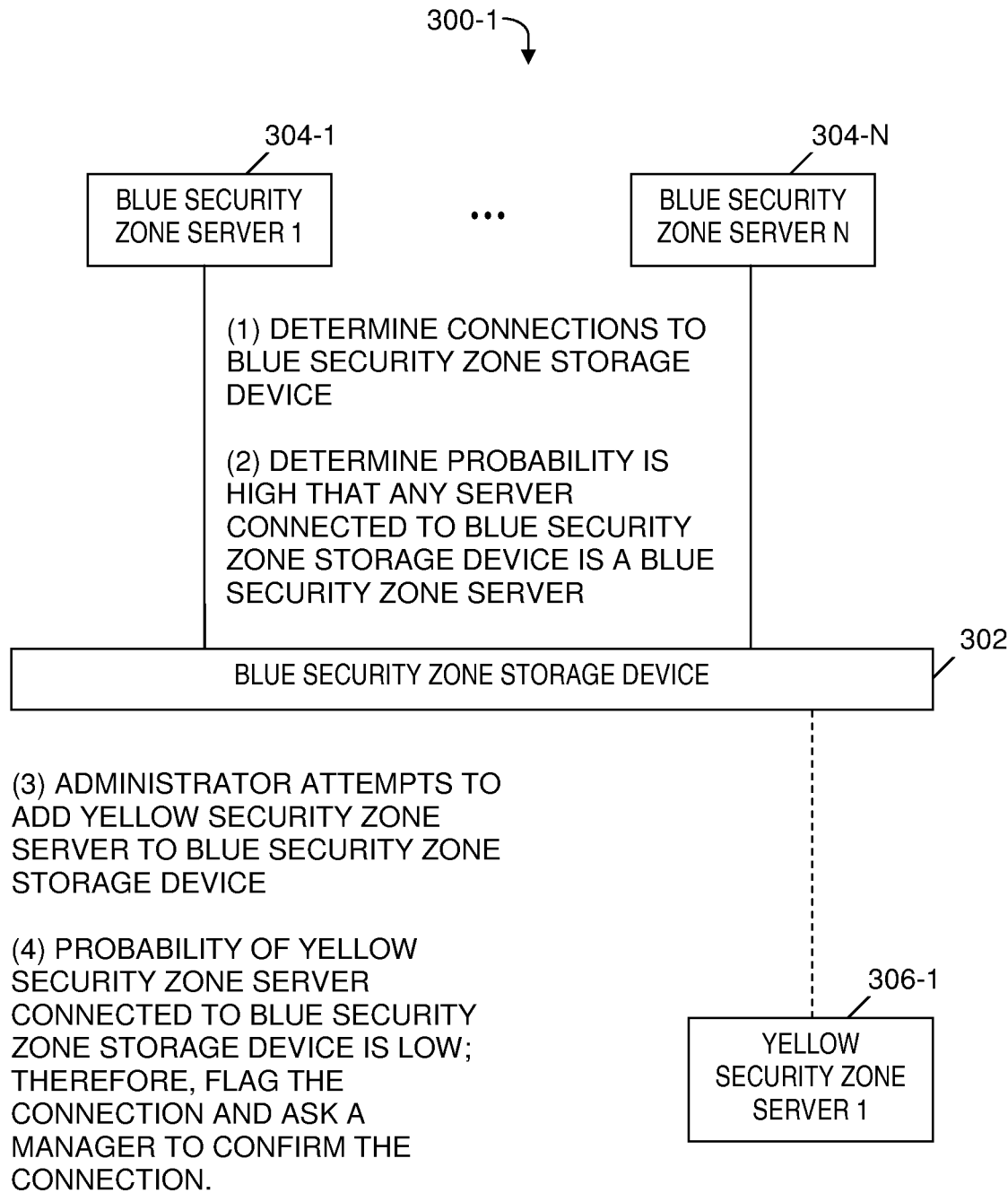
FIGS. 3A-3B depicts an example of managing connections of servers in one security zone to a storage device in another security zone, in accordance with embodiments of the present invention.
Figure 3B:
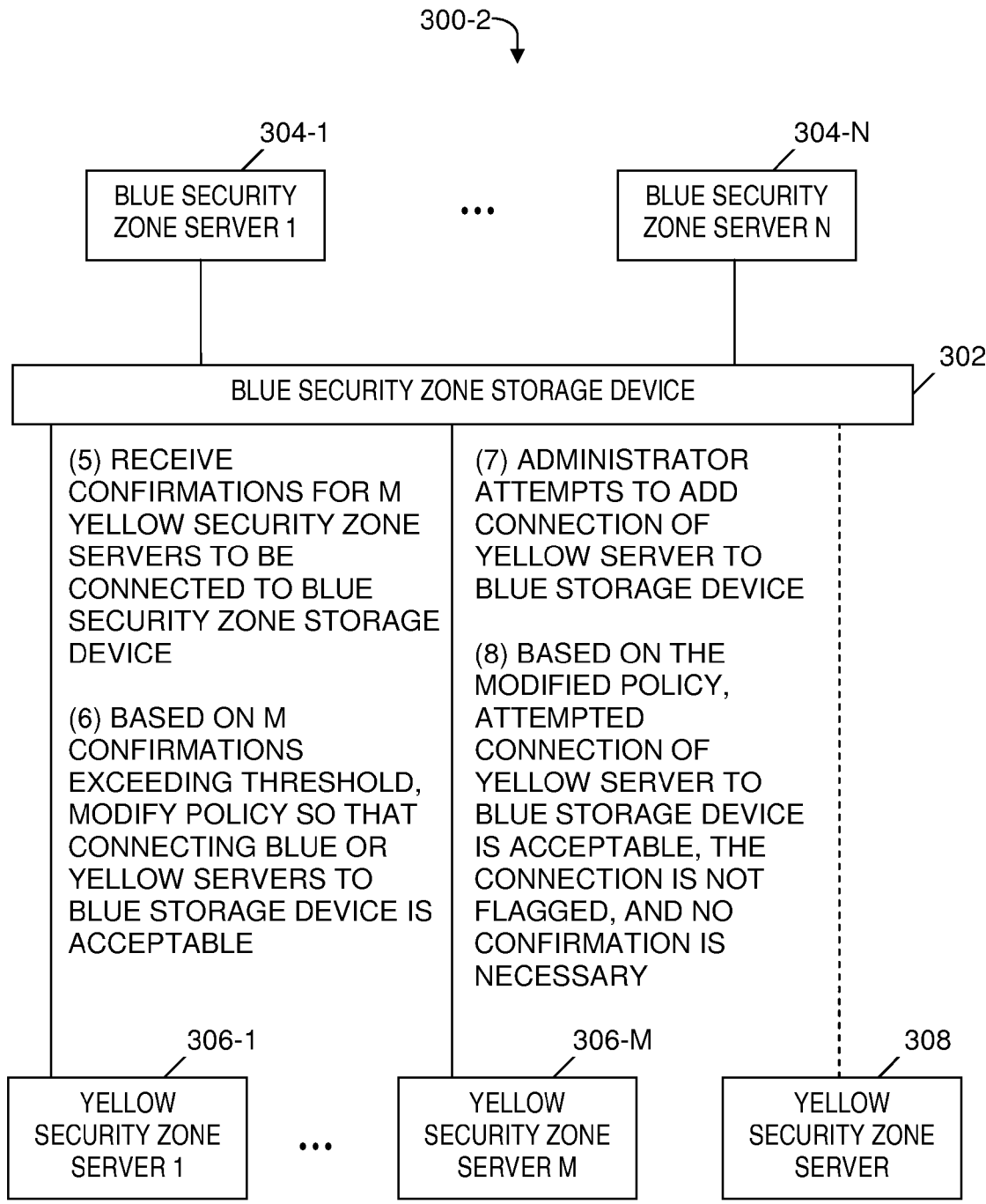

FIGS. 3A-3B depicts an example of managing connections of servers in one security zone to a storage device in another security zone, in accordance with embodiments of the present invention. A first exemplary view 300-1 of a system includes a storage device 302 and servers 304-1 . . . 304-N, where N is an integer greater than one. In step (1) depicted in FIG. 3A, connection management program 114 (see FIG. 1) determines that the connections in the system include only the connections between storage device 302 and servers 304-1 . . . 304-N, and further determines that storage device 302 and servers 304-1 . . . 304-N are in a blue security zone, which indicates the highest level of security.

In step (2) depicted in FIG. 3A, connection management program 114 (see FIG. 1) determines that the probability is high (i.e., the probability exceeds a threshold value) that any server connected to storage device 302 is a server in a blue security zone. Connection management program 114 (see FIG. 1) determines a high probability in step (2) because all of the servers currently connected to storage device 302 are servers in the blue security zone.

In step (3) depicted in FIG. 3A, an administrator attempts to add a connection from server 306-1 to storage device 302. Server 306-1 is in a yellow security zone, which is a lower security level than the blue security zone.

In step (4) depicted in FIG. 3A, connection management program 114 (see FIG. 1) determines that the probability is low (i.e., less than another threshold value) that a server in a yellow security zone (e.g., server 306-1) is allowed to be connected to a storage device in a blue security zone (e.g., storage device 302). The probability determined in step (4) is low because the probability determined in step (2) is high and the proposed connection from server 306-1 to a blue security storage device 302 is inconsistent with the classification of server 306-1 as a yellow security zone server. Because the probability determined in step (4) is low, connection management program 114 (see FIG. 1) flags the connection from server 306-1 to storage device 302 and asks a manager to confirm that the connection from server 306-1 to storage device 302 is allowable.

Step (1) may be included in step 202 (see FIG. 2A). Step (2) may be included in step 204 (see FIG. 2A). Step (3) may be included in step 208 (see FIG. 2A). Step (4) may be included in step 210 (see FIG. 2A) and step 216 (see FIG. 2B).

A second exemplary view 300-2 in FIG. 3B is a subsequent view of the system whose first exemplary view 300-1 is included in FIG. 3A. Second exemplary view 300-2 includes servers 304-1 . . . 304-N in the blue security zone connected to storage device 302 in the blue security zone.

In step (5) depicted in FIG. 3B, connection management program 114 (see FIG. 1) receives M confirmations for M servers 306-1 . . . 306-M in the yellow security zone, where M is an integer greater than one. The M received confirmations allow servers 306-1 . . . 306-M in the yellow security zone to be connected to storage device 302 in the blue security zone.

In step (6) depicted in FIG. 3B, connection management program 114 (see FIG. 1) determines that the number of received confirmations (i.e., M) exceeds a threshold value for received confirmations, and in response thereto, connection management program 114 (see FIG. 1) modifies a policy included in policies 124 (see FIG. 1) so that connecting any server in a yellow security zone to a storage device in a blue security zone is acceptable. Connecting any server in a blue security zone to a storage device in a blue security zone is still acceptable according to the modified policy.

In step (7) depicted in FIG. 3B, an administrator attempts to add a connection from server 308 in a yellow security zone to storage device 302 in a blue security zone.

In step (8), based on the policy modified in step (6), connection management program 114 (see FIG. 1) automatically allows the connection of server 308 to storage device 302, without flagging the connection and without requesting confirmation of the connection.

Step (5) may be included in steps 218 and 222 in FIG. 2B. Step (6) may be included in step 218 (see FIG. 2B), which is included in step 222 (see FIG. 2B). Step (7) may be included in step 208 (see FIG. 2B), which is included in step 222 (see FIG. 2B). Step (8) may be included in step 224 (see FIG. 2B).

Computer System

In one embodiment, computer system 101 in FIG. 1 implements the process of FIGS. 2A-2B. Computer system 101 generally comprises a central processing unit (CPU) 102, a memory 104, an input/output (I/O) interface 106, and a bus 108. Further, computer system 101 is coupled to I/O devices 110 and a computer data storage unit 112. CPU 102 performs computation and control functions of computer system 101, including executing instructions included in connection management program 114 (also known as program code 114) to perform a method managing a connection to or from a device in a networked environment to enforce or audit a security policy, where the instructions are executed by CPU 102 via memory 104. In one embodiment, the CPU 102 executes instructions included in program code 114 to verify a proposed or existing connection to or from a device. In one embodiment, the CPU 102 executes instructions included in program code 114 to identify available device(s) that are compliant with a policy. CPU 102 may comprise a single processing unit, or be distributed across one or more processing units in one or more locations (e.g., on a client and server).

Memory 104 may comprise any known computer-readable storage device, which is described below. In one embodiment, cache memory elements of memory 104 provide temporary storage of at least some program code (e.g., program code 114) in order to reduce the number of times code must be retrieved from bulk storage while instructions of the program code are carried out. Moreover, similar to CPU 102, memory 104 may reside at a single physical location, comprising one or more types of data storage, or be distributed across a plurality of physical systems in various forms. Further, memory 104 can include data distributed across, for example, a local area network (LAN) or a wide area network (WAN).

I/O interface 106 comprises any system for exchanging information to or from an external source. I/O devices 110 comprise any known type of external device, including a display device (e.g., monitor), keyboard, mouse, printer, speakers, handheld device, facsimile, etc. Bus 108 provides a communication link between each of the components in computer system 101, and may comprise any type of transmission link, including electrical, optical, wireless, etc.

I/O interface 106 also allows computer system 101 to store information (e.g., data or program instructions such as program code 114) on and retrieve the information from computer data storage unit 112 or another computer data storage unit (not shown). Computer data storage unit 112 may comprise any known computer-readable storage device, which is described below. For example, computer data storage unit 112 may be a non-volatile data storage device, such as a magnetic disk drive (i.e., hard disk drive) or an optical disc drive (e.g., a CD-ROM drive which receives a CD-ROM disk).

Memory 104 and/or storage unit 112 may store computer program code 114 that includes instructions that are executed by CPU 102 via memory 104 to manage a connection to or from a device in a networked environment to enforce or audit a security policy. In one embodiment, memory 104 and/or storage unit 112 stores program code 114 that includes instructions that are executed by CPU 102 via memory 104 to manage a connection to or from a device in a networked environment to enforce or audit a security policy. Although FIG. 1 depicts memory 104 as including program code 114, the present invention contemplates embodiments in which memory 104 does not include all of code 114 simultaneously, but instead at one time includes only a portion of code 114.

Further, memory 104 may include other systems not shown in FIG. 1, such as an operating system (e.g., a Linux® operating system) that runs on CPU 102 and provides control of various components within and/or connected to computer system 101.

Storage unit 112 and/or one or more other computer data storage units (not shown) that are coupled to computer system 101 may store (1) policies 124; (2) data 122 originally collected by agents 120-1 . . . 120-N and sent to computer system 101, where data 122 includes information identifying and describing attributes of devices 116-1 . . . 116-N and connections between devices 116-1 . . . 116-N; (3) a mapping (not shown) of devices 116-1 . . . 116-N to corresponding policies 124; and (4) which connections are not compliant with policies 124.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable storage devices (e.g., memory 104 and/or computer data storage unit 112) having computer-readable program code (e.g., program code 114) embodied or stored thereon.

Any combination of one or more computer-readable storage mediums (e.g., memory 104 and computer data storage unit 112) may be utilized. In one embodiment, the computer-readable storage medium is a computer-readable storage device or computer-readable storage apparatus. A computer-readable storage device may be, for example, an electronic, magnetic, optical, electromagnetic, disk storage, or semiconductor system, apparatus, device or any suitable combination of the foregoing. A non-exhaustive list of more specific examples of the computer-readable storage device includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage device is a tangible medium that can store a program (e.g., program 114) for use by or in connection with a system, apparatus, or device for carrying out instructions. However, the terms "computer-readable storage medium" and "computer-readable storage device" do not encompass a propagation medium.

Program code (e.g., program code 114) may be transmitted using any appropriate medium, including but not limited to wireless, wireline, optical fiber cable, radio frequency (RF), etc., or any suitable combination of the foregoing.

Computer program code (e.g., program code 114) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 101 or another computer system (not shown) having components analogous to the components of computer system 101 included in FIG. 1. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to a flowchart illustration (e.g., FIGS. 2A-2B) and/or block diagrams of methods, apparatus (systems) (e.g., FIG. 1), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 114). These computer program instructions may be provided to one or more hardware processors (e.g., CPU 102) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable device (e.g., memory 104 or computer data storage unit 112) that can direct a computer (e.g., computer system 101), other programmable data processing apparatus, or other devices to function in a particular manner, such that the instructions (e.g., instructions included in program code 114) stored in the computer-readable storage device produce an article of manufacture including instructions which implement the function/act specified in the flowchart and/or block diagram block or blocks.

The computer program instructions may also be loaded onto a computer (e.g., computer system 101), other programmable data processing apparatus, or other devices to cause a series of operational steps to be performed on the computer, other programmable apparatus, or other devices to produce a computer implemented process such that the instructions (e.g., instructions included in program code 114) which are carried out on the computer, other programmable apparatus, or other devices provide processes for implementing the functions/acts specified in the flowchart and/or block diagram block or blocks.

The flowchart in FIGS. 2A-2B and the block diagram in FIG. 1 illustrate the architecture, functionality, and operation of possible implementations of systems, methods, and computer program products according to various embodiments of the present invention. In this regard, each block in the flowchart or block diagrams may represent a module, segment, or portion of code (e.g., program code 114), which comprises one or more executable instructions for implementing the specified logical function(s). It should also be noted that, in some alternative implementations, the functions noted in the block may occur out of the order noted in the figures. Two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a connection to or from a device, the method comprising the steps of:
   a computer identifying connections of the device;
   based on the connections, the computer determining and classifying the device based on security zones to which the device is or has been connected, a quality of service requirement for one or more applications within the device, or a level of information technology service management (ITSM) for the device;
   the computer determining that an existing or proposed connection is inconsistent with the classification of the device, and subsequently, the computer receiving a confirmation of the existing or proposed connection from a user, the confirmation permitting the existing or proposed connection to remain unchanged, without a modification of the existing or proposed connection and without a modification of a policy that specifies the classification of the device, even though the existing or proposed connection is inconsistent with the classification, and the computer displaying an indication or sending a notification that the existing or proposed connection is inconsistent with the classification of the device;
   the computer determining one or more other devices have one or more classifications that match the classification of the device;
   the computer determining respective one or more other existing or proposed connections of the one or more other devices are inconsistent with the one or more classifications;
   the computer receiving one or more other confirmations of the one or more other existing or proposed connections;
   the computer determining a count of the confirmation and the one or more other confirmations and determining the count is greater than a threshold number of confirmations;
   subsequent to the step of determining the count, the computer classifying another device based on security zones to which the other device is or has been connected, a quality of service requirement for one or more applications within the other device, or a level of ITSM for the other device;
   the computer determining another existing or proposed connection of the other device is inconsistent with the classification of the other device; and
   based on the count being greater than the threshold number of confirmations, the computer permitting another existing or proposed connection of the other device to remain unchanged, without requiring a confirmation of the other existing or proposed connection, without a modification of the other existing or proposed connection and without a modification of a policy that specifies the classification of the other device, even though the other existing or proposed connection is inconsistent with the classification.

2. The method of claim 1, wherein the computer determines and classifies the device based on the security zones to which the device is or has been connected, the quality of service requirement for one or more applications within the device, and the level of ITSM for the device.

3. The method of claim 1, wherein the computer determines that the existing or proposed connection is inconsistent with the classification of the device, and in response, the computer modifying the existing or proposed connection to be consistent with the classification of the device.

4. The method of claim 3, wherein the step of modifying the existing or proposed connection includes replacing the existing or proposed connection with a new connection between the device and another device so that the new connection is in compliance with a policy that specifies the security zones to which the device is or has been connected, the quality of service requirement for the one or more applications within the device, or the level of ITSM for the device.

5. The method of claim 1, wherein the computer determines that the existing or proposed connection is inconsistent with the classification of the device, and subsequently, the computer receiving a modification of the existing or proposed connection, and subsequent to receiving the modification, the computer determining whether the modification of the existing or proposed connection is consistent with the classification of the device.

6. The method of claim 1, wherein the computer determines that the existing or proposed connection is inconsistent with the classification of the device, and in response, the computer modifying a policy that specifies the classification of the device so that the existing or proposed connection is consistent with the classification based on the modified policy.

7. The method of claim 1, wherein the step of the computer determining and classifying the device includes the steps of:
the computer determining a probability of the device having the security zones to which the device is or has been connected, the quality of service requirement for the one or more applications within the device, or the level of ITSM by generating a Bayesian belief network through which evidence is propagated, the evidence including known factors of other devices, the known factors including at least one of: security zones to which the other devices are or have been connected, quality of service requirements for one or more applications within the other devices, and levels of ITSM of the other devices.

8. The method of claim 1, further comprising the steps of:
the computer determining and classifying other devices based on security zones to which the other devices are or have been connected, quality of service requirements for one or more applications within the other devices, and levels of ITSM of the other devices;
the computer receiving a request to identify device(s) having respective connection(s) that are in compliance with a policy that specifies the classifications of the other devices;
in response to the step of receiving the request, the computer selecting the device(s) from the other devices so that the connection(s) are consistent with respective classification(s) of the device(s);
based on the connection(s) being consistent with the classification(s), the computer determining the connection(s) are in compliance with the policy; and
the computer initiating a display of identification(s) of the device(s) whose connection(s) are in compliance with the policy or creating a new connection to at least one of the device(s).

9. A computer system for managing a connection to or from a device, the computer system comprising:
a CPU;
a computer-readable memory;
a computer-readable storage device;
first program instructions to identify connections of the device;
second program instructions to, based on the connections, determine and classify the device based on security zones to which the device is or has been connected, a quality of service requirement for one or more applications within the device, or a level of information technology service management (ITSM) for the device;
third program instructions to determine that an existing or proposed connection is inconsistent with the classification of the device, and subsequently, receive a confirmation of the existing or proposed connection from a user, the confirmation permitting the existing or proposed connection to remain unchanged, without a modification of the existing or proposed connection and without a modification of a policy that specifies the classification of the device, even though the existing or proposed connection is inconsistent with the classification and display an indication or send a notification that the existing or proposed connection is inconsistent with the classification of the device,
fourth program instructions to determine one or more other devices have one or more classifications that match the classification of the device;
fifth program instructions to determine respective one or more other existing or proposed connections of the one or more other devices are inconsistent with the one or more classifications;
sixth program instructions to receive one or more other confirmations of the one or more other existing or proposed connections;
seventh program instructions to determine a count of the confirmation and the one or more other confirmations and determine the count is greater than a threshold number of confirmations;
eighth program instructions to, subsequent to the seventh program instructions determining the count, classify another device based on security zones to which the other device is or has been connected, a quality of service requirement for one or more applications within the other device, or a level of ITSM for the other device;
ninth program instructions to determine another existing or proposed connection of the other device is inconsistent with the classification of the other device; and
tenth program instructions to, based on the count being greater than the threshold number of confirmations, permit another existing or proposed connection of the other device to remain unchanged, without requiring a confirmation of the other existing or proposed connection, without a modification of the other existing or proposed connection and without a modification of a policy that specifies the classification of the other device, even though the other existing or proposed connection is inconsistent with the classification,
wherein the first, second, third, fourth, fifth, sixth, seventh, eighth, ninth, and tenth program instructions are stored on the computer-readable storage device for execution by the CPU via the computer-readable memory.

10. The computer system of claim 9, wherein the second program instructions determine and classify the device based on the security zones to which the device is or has been connected, the quality of service requirement for one or more applications within the device, and the level of ITSM for the device.

11. The computer system of claim 9, wherein the third program instructions determine that the existing or proposed connection is inconsistent with the classification of the device, and in response, modify the existing or proposed connection to be consistent with the classification of the device.

12. The computer system of claim 11, wherein the third program instructions modify the existing or proposed connection by replacing the existing or proposed connection with a new connection between the device and another device so that the new connection is in compliance with a policy that specifies the security zones to which the device is or has been connected, the quality of service requirement for the one or more applications within the device, or the level of ITSM for the device.

13. The computer system of claim 9, wherein the third program instructions determine that the existing or proposed connection is inconsistent with the classification of the device, and subsequently, receive a modification of the existing or proposed connection, and subsequent to receiving the modification, determine whether the modification of the existing or proposed connection is consistent with the classification of the device.

14. A computer program product for managing a connection to or from a device, the computer program product comprising:
   computer-readable storage device(s); and
   computer-readable program instructions stored on the computer-readable storage device(s), the computer-readable program instructions when executed by a CPU:
      identify connections of the device;
      based on the connections, determine and classify the device based on security zones to which the device is or has been connected, a quality of service requirement for one or more applications within the device, or a level of information technology service management (ITSM) for the device;
      determine that an existing or proposed connection is inconsistent with the classification of the device, and subsequently, receive a confirmation of the existing or proposed connection from a user, the confirmation permitting the existing or proposed connection to remain unchanged, without a modification of the existing or proposed connection and without a modification of a policy that specifies the classification of the device, even though the existing or proposed connection is inconsistent with the classification, and display an indication or send a notification that the existing or proposed connection is inconsistent with the classification of the device;
      determine one or more other devices have one or more classifications that match the classification of the device;
      determine respective one or more other existing or proposed connections of the one or more other devices are inconsistent with the one or more classifications;
      receive one or more other confirmations of the one or more other existing or proposed connections;
      determine a count of the confirmation and the one or more other confirmations and determine the count is greater than a threshold number of confirmations;
      classify, subsequent to determining the count, another device based on security zones to which the other device is or has been connected, a quality of service requirement for one or more applications within the other device, or a level of ITSM for the other device;
      determine another existing or proposed connection of the other device is inconsistent with the classification of the other device; and
      based on the count being greater than the threshold number of confirmations, permit another existing or proposed connection of the other device to remain unchanged, without requiring a confirmation of the other existing or proposed connection, without a modification of the other existing or proposed connection and without a modification of a policy that specifies the classification of the other device, even though the other existing or proposed connection is inconsistent with the classification.

15. The program product of claim 14, wherein the computer-readable program instructions, when executed by the CPU, determine and classify the device based on the security zones to which the device is or has been connected, the quality of service requirement for the one or more applications within the device, and the level of ITSM for the device.

16. The program product of claim 14, wherein the computer-readable program instructions, when executed by the CPU, determine that the existing or proposed connection is inconsistent with the classification of the device, and in response, modify the existing or proposed connection to be consistent with the classification.

17. The program product of claim 16, wherein the computer-readable program instructions, when executed by the CPU, modify the existing or proposed connection by replacing the existing or proposed connection with a new connection between the device and another device so that the new connection is in compliance with a policy that specifies the security zones to which the device is or has been connected, the quality of service requirement for the one or more applications within the device, or the level of ITSM for the device.

18. The program product of claim 14, wherein the computer-readable program instructions, when executed by the CPU, determine that the existing or proposed connection is inconsistent with the classification of the device, and subsequently, receive a modification of the existing or proposed connection, and subsequent to receiving the modification, determine whether the modification of the existing or proposed connection is consistent with the classification of the device.

* * * * *